Oct. 25, 1927. 1,647,013
F. C. PARTRIDGE
OVEN SLIDE
Filed Feb. 16, 1927
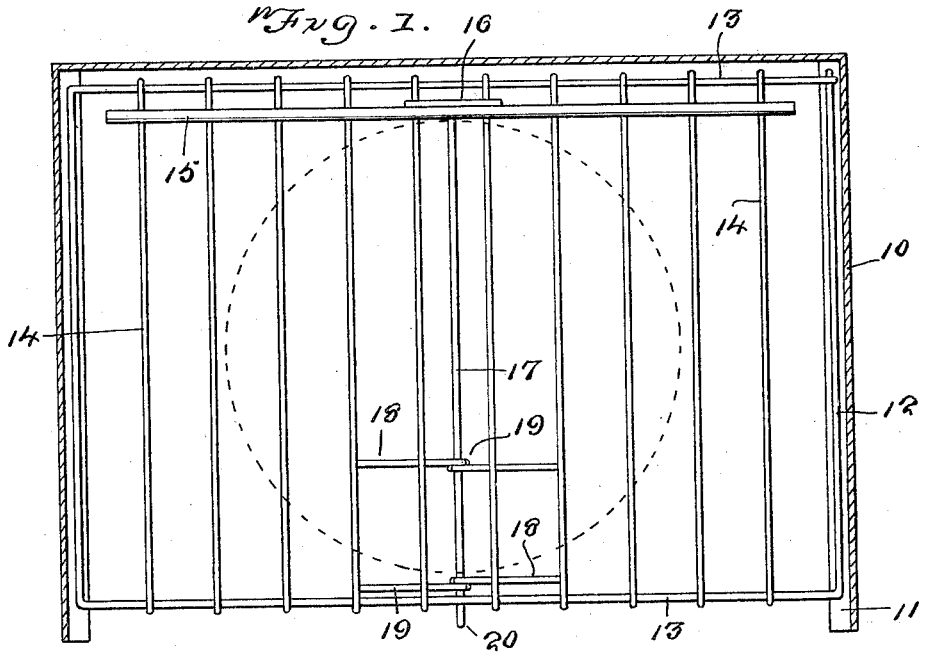
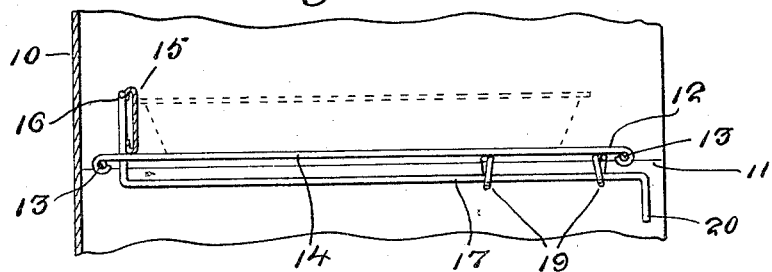
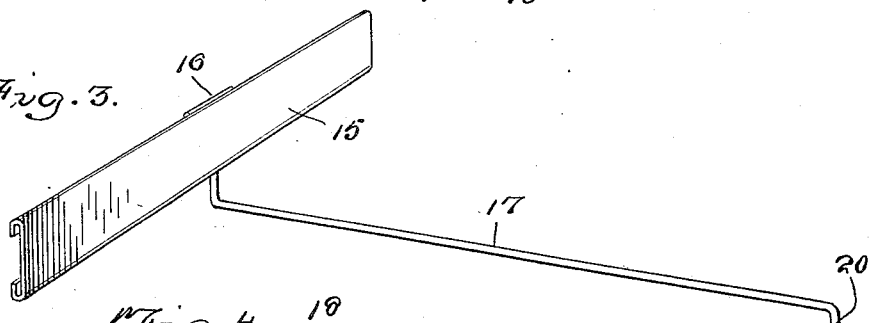
F. C. Partridge INVENTOR
BY *Victor J. Evans*
ATTORNEY Patented Oct. 25, 1927.

1,647,013

UNITED STATES PATENT OFFICE.

FREDERICK CRONE PARTRIDGE, OF MOBILE, ALABAMA.

OVEN SLIDE.

Application filed February 16, 1927. Serial No. 168,697.

This invention relates to improvements in oven racks for stoves and has for an object the provision of means associated with an oven rack for the purpose of sliding a pan or other article forward, so that the said pan or article may be conveniently removed from the oven without danger of burning the hands through contact with the walls or other parts of said oven.

Another object of the invention is the provision of means for accomplishing the above, which may be attached to any ordinary oven rack.

With the above and other objects in view, the invention further includes the following novel features and details of construction, to be hereinafter more fully described, illustrated in the accompanying drawings and pointed out in the appended claims.

In the drawings:—

Figure 1 is a fragmentary sectional view illustrating a portion of the oven of a stove having a rack positioned therein and equipped with the present invention.

Figure 2 is a vertical central sectional view.

Figure 3 is a detail perspective view of the push bar.

Figure 4 is a detail perspective view of one of the guides for the push bar rod.

Referring to the drawings in detail wherein like characters of reference designate corresponding parts, the reference character 10 indicates a portion of a stove oven which is provided with ribs 11 for supporting an oven rack 12 of the usual character. The rack as is usual in devices of this character comprises parallel rods 13 and transverse connecting rods 14.

The invention comprises a push bar 15 which is mounted for sliding movement over the top of the rack and which has connected thereto as indicated at 16, the rightangled end of a rod 17. This rod extends transversely across the oven rack preferably between two central rods 14 and operates through spaced guides carried by the oven rack. These guides are shown in detail in Figure 4 of the drawings and comprise bars 18 which are secured to the rods 14 and which are provided with central eyes 19 through which the rod 17 is slidable. The outer end of the rod 17 is provided with a rightangled end 20 which forms a handle.

Normally, the bar 15 is positioned along the inner edge of the oven rack and when it is desired to remove a hot pan or other article, the bar 15 is pulled forward over the rack through the medium of the handle 20. The pan, which is shown by the dotted lines in Figures 1 and 2 of the drawings, is accordingly moved forward so as to extend over the outer edge of the oven rack, when it may be conveniently grasped for removal.

By the use of the present invention, pans or other hot articles may be conveniently removed from the oven without danger of the hands coming in contact with any of the heated parts of the open. The construction is such that the invention may be attached to any ordinary oven rack by fastening the guide rods 18 to the bars 14 of the rack as by welding or any other suitable manner.

The invention is susceptible of various changes in its form, proportions and minor details of construction and the right is herein reserved to make such changes as properly fall within the scope of the appended claims.

Having described the invention what is claimed is:—

1. In combination with a bake oven rack, a push bar adapted to be positioned at one edge of the rack and slidable over the top thereof and an actuating rod having one end secured to the rack and its opposite end positioned adjacent the other edge of the rack to slide the bar.

2. In combination, an oven rack, a push bar positioned upon the rack, a rod having one end secured to the bar and extending beneath the rack, a handle at the outer end of the bar and means carried by the rack and receiving the rod to guide the latter.

In testimony whereof I affix my signature.

FREDERICK CRONE PARTRIDGE.